July 1, 1924.

G. H. FRASER 1,499,515

AIR AND OTHER SEPARATOR

Original Filed July 19, 1917 3 Sheets-Sheet 1

INVENTOR.

George Holt Fraser

Patented July 1, 1924.

1,499,515

UNITED STATES PATENT OFFICE.

GEORGE HOLT FRASER, OF BROOKLYN, NEW YORK.

AIR AND OTHER SEPARATOR.

Application filed July 19, 1917, Serial No. 181,538. Renewed October 3, 1923.

*To all whom it may concern:*

Be it known that I, GEORGE HOLT FRASER, a citizen of the United States, residing in the borough of Brooklyn, county of Kings, city and State of New York, have invented certain new and useful Improvements in Air and Other Separators of which the following is a specification.

This invention relates to separators in which a fluid current is used to separate fine particles from finely divided material, and aims to provide improvements therein.

In air separators it has been common to distribute material in a vertical cylindrical casing so that it will fall in an annular blanket therein and to cause a current to flow outwardly through the descending material to float fine material outwardly therefrom, the current expanding and contracting from and toward the vertical axis of the casing.

My present invention aims to provide an air separator in which such annular distribution of material and such outward and inward current flow can be avoided.

Figure 1:
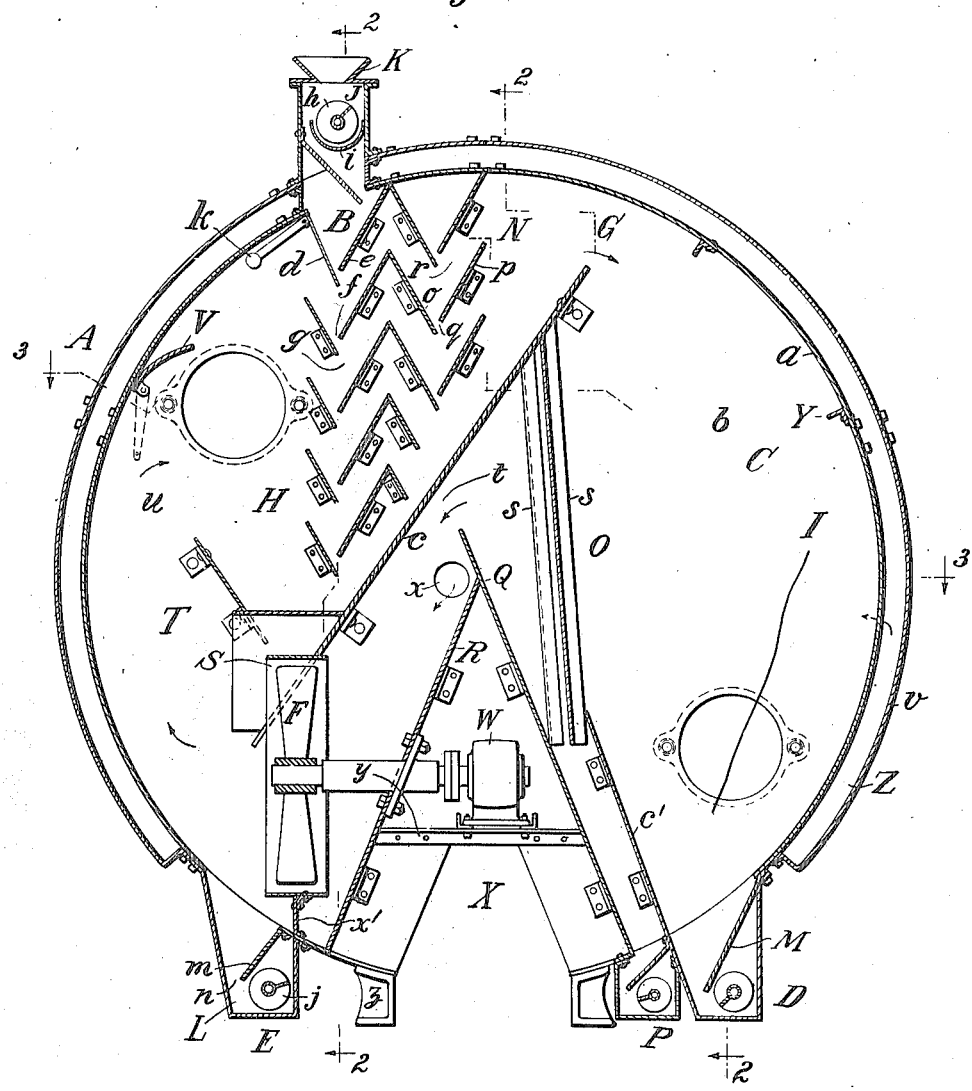
Figure 2:
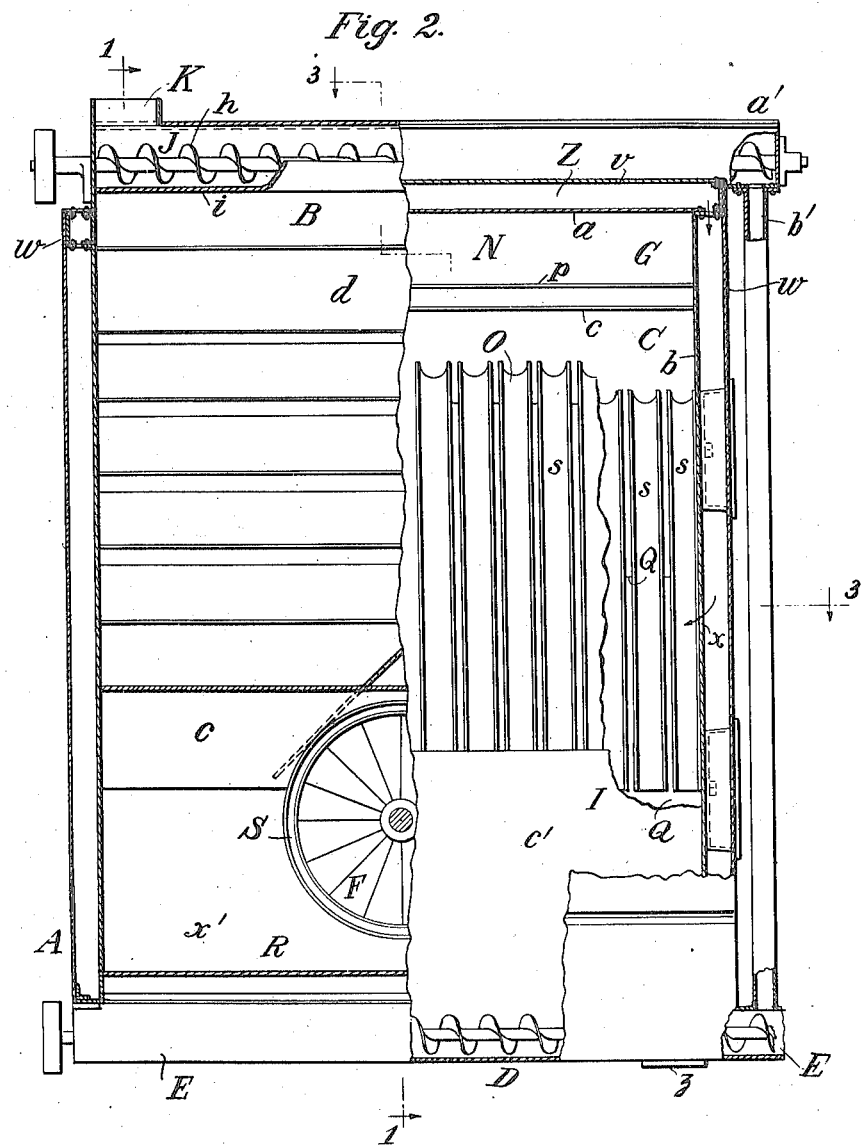
Figure 3:
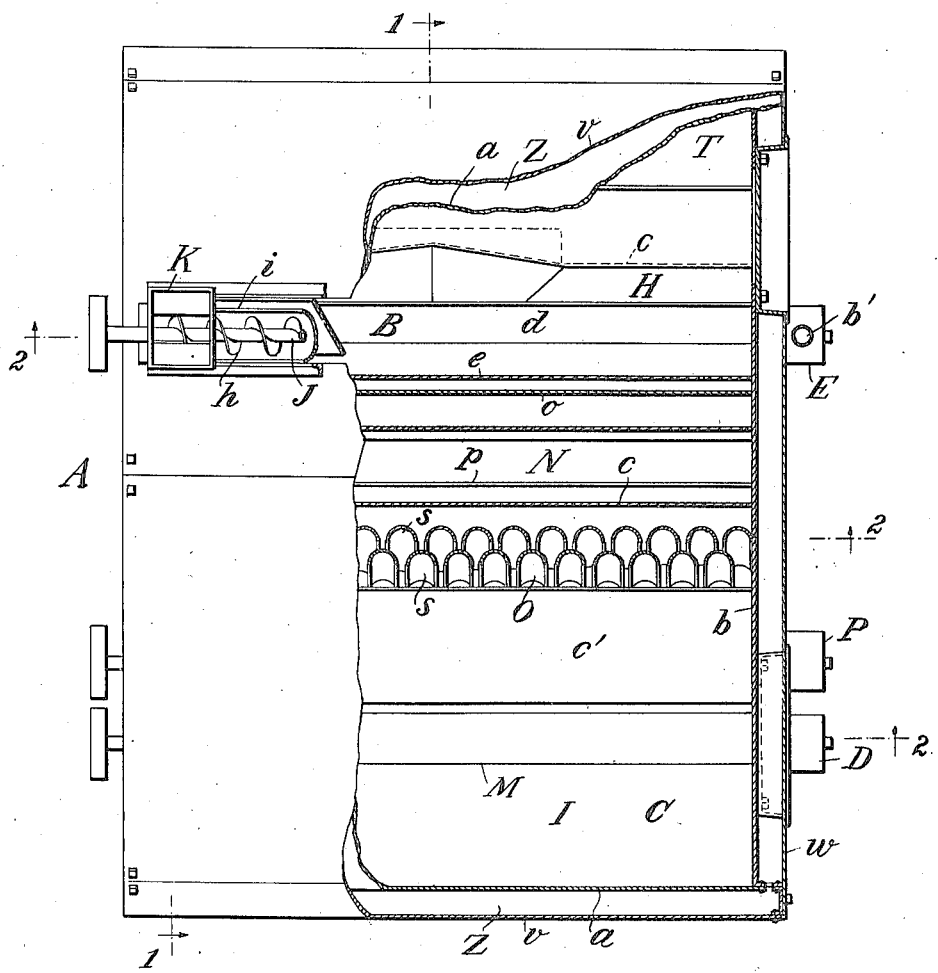

To this end in carrying out my present improvements in their preferred form I provide means for distributing the material horizontally so that it will be delivered in an approximately rectilinear line and descend in a vertical path within the separator casing, and I provide means for causing the fluid current to circulate around the casing circumferentially as distinguished from inwardly and outwardly radially thereof, and I provide various other features of improvement, of which each will be more fully hereinafter set forth with reference to the accompanying drawings, in which, Fig. 1 is a vertical transverse mid-section of the preferred form of my improved separator;

Fig. 2 is a rear elevation thereof partly in vertical section on the planes of the lines 2—2 of Fig. 1, and Fig. 3 is a plan view thereof partly in horizontal section on the planes of the lines 3—3 in Figs. 1 and 2.

Referring to the drawings let A indicate the frame or casing, B the inlet, C the separating chamber, D the fine outlet, E the coarse outlet, and F the blower of an air separator. These parts may be of any usual or suitable construction by which pulverized material may be introduced through the inlet B into the chamber C and a current caused to flow through the descending material to float fine material therefrom so that this fine material can be withdrawn through the fine outlet and the tailings can escape through the coarse outlet.

According to one feature of this invention I provide an endless current passage G and cause the pulverulent material to descend in a vertical path or blanket intersecting this passage so that current flowing therein must traverse the descending material, and I provide retarders or baffles for the descending material, interceptors or selectors for arresting large particles in the current, extracting means for intercepting fine floating material from the current, and deflecting or distributing means equalizing the current.

Preferably the casing A has a removable sectional side wall $a$ and end walls $b$ affording a closure for the chamber C, which latter preferably has the form of a cylinder disposed about a horizontal axis. The chamber C is divided by a partition $c$ spaced apart from the wall $a$ and extending from one to the other wall $b$, and the current passage G is afforded by the space between the wall $a$ and the partition $c$, the lower end of the partition extending beneath the inlet B, from which the falling blanket of pulverulent material will descend across this passage from the inlet to the partition, the lower end of the partition is above the outlet E to which coarse material will fall from the partition. The blower F beneath the partition causes the current to flow forwardly under the latter, from which it rises and flows over the partition through the descending material and across the top of the partition to return to the blower.

The space in front of the partition serves as a feed chamber H and that back of the partition has a settling chamber I, in which fine material may precipitate and descend to the outlet as the current travels circumferentially around the chamber C.

Preferably a series of reversely inclined spaced baffle plates $d$ and $e$ are mounted in the inlet B and afford between them a downwardly extending undulating material path $f$ along which the material descends step by step in a wide thin stream, and horizontally and rearwardly and outwardly extending current passages *g* through which the fluid current may flow to float fine material from the descending mass.

The superposed baffles discharge from one to another and finally on to the partition *c*, and preferably extend horizontally rectilinearly from one to the other end *b*.

To insure uniform mass of material from end to end of the baffles I prefer to provide an equalizer J for distributing the material from the hopper K when the width of the separator is too great for even distribution from the hopper by gravity. The distributor J preferably comprises a conveyor *h* and a trough *i*, the edge of which is adjustable and is disposed at such height that the conveyor will discharge material over the edge into the inlet B as long as the material therein is below the level of the edge, but when the material rises to this level further discharge will be prevented and the conveyor will feed the material along until it can be discharged over the edge and any excess will be discharged at the end *a'* of the conveyor and fall through a conduit *b'* to the tailings outlet exteriorly of the chamber, the object of this arrangement being to maintain a uniform supply of material throughout the length of the baffles as well as to insure a closure to prevent escape of current through the inlet by insuring that this shall always be full of material.

The trailings outlet E is similarly sealed against current leakage by controlling its discharge so as to keep a body of material in the outlet, and when the width of the separator requires it this is also provided with a controller L comprising a conveyor *j* which will cause the material to flow only as fast as it descends under the lip *m* of the contracted longitudinally extending outlet *n* of the tailings outlet. A similar controller M is preferably provided for sealing the fine outlet D. To intercept large particles in the current passing the baffles, my invention preferably provides selecting means N preferably consisting of reversely inclined spaced baffles or plates *o* and *p* affording between their edges precipitate outlets *q*, and between superposed plates sinuous current passages *r*, communicating with the passages *g* for receiving current therefrom, which baffles intercept any large particles floating in the current and precipitate these on to the partition *c*, while permitting the current to carry finer material onwardly and upwardly through the passage G over the top of the partition into the settling chamber I where it descends under the partition to again reach the blower. The material carried by the current may precipitate in the chamber I, or may be thrown out centrifugally owing to the circular path of the current as it travels the cylindrical wall *a*, but my invention also preferably provides filtering or extracting provisions O for extracting from the current fine particles not precipitated in the chamber I. Preferably I provide two series of hollow troughs *s* with their concave sides opposed to the current, which troughs extend downwardly and are inclined slightly toward the approaching current, and are spaced apart at their edges, those of one row being staggered relatively to those of the next row, so that these will intercept the current flowing under the partition G. Their concavities will afford dead spaces in which floating particles may precipitate as the current passes through them to reach the blower.

Preferably my invention provides for separately removing the extraction of these troughs *s* by providing a separate partition *c'* and outlet P therefor.

To equalize the current flowing through the troughs *s* I prefer to provide a deflector Q inwardly of these troughs and a deflector R inwardly and spaced apart from the latter to afford a sinuous passage *t* through which the returning current is drawn by the fan so that the suction may distribute evenly from end to end of the passage to avoid undue intensity near the fan.

I preferably provide a tubular conduit S in front of the fan affording a wall for dividing the tailings descending from immediately above and a contracted current passage opening into a current spreading chamber T where the blast from the fan may distribute and flow evenly through the current outlet *u*, above which I adjustably mount or hinge a distributing deflector V which may be adjusted to more or less distribute the current vertically to the descending path of material.

My invention preferably provides for enclosing the parts described within an outer chamber Z which is enclosed by an annular wall *v* and end walls *w* and has apertures *x* communicating with the inner chamber near the suction side of the fan so there is a tendency for a rarefaction in the outer chamber sufficient to draw inwardly any dust or current leaking into the latter. The blower may be driven by any suitable motor mounted at any suitable place, as for example the motor W mounted on a removable support or bracket *y*, and the casing may be mounted on suitable supports, as the legs *z*.

The sides and ends will be separably connected together, and the baffles, partitions, troughs and blower will be removably mounted so that each can be renewed or removed for repair without difficulty, or one can be used with or without another according to the work required or the material to be treated.

In operation the width of the separator will be in proportion to the amount of work to be handled, and the treating and removal provisions will be determined to suit the width. Material will descend slowly between the baffles, the current will be suited by adjusting the speed of the fan to the material or quantity being treated, the selectors will prevent large particles from being carried into the settling chamber, and the extractors will intercept fine material floating in the returning current.

It will be understood that my invention provides improvements which can be readily and advantageously availed of in whole or in part, and that the invention is not limited to the particular details of construction, arrangement, or combination of parts, set forth as constituting its preferred form, since it can be employed in whole or in part according to such modifications as circumstances or the judgement of those skilled in the art may dictate without departing from the sipirt of the invention.

For example while I prefer to dispose the current passage, and progress the current, in a vertical plane around the horizontal longitudinal axis of the chamber, it will be understood that this passage may be disposed in any desired plane, and may not necessarily be confined entirely within the chamber, and that it is not essential that the current generating means be within the casing itself.

I prefer to mount the top plate d movably or adjustably so that it can be moved toward or from the top plate e to close or open the inlet, and to press it toward the closed position by a weight or spring n so it will automatically close when the inlet empties to prevent escape of current.

I prefer to provide a recess or chamber X for receiving the motor or other driving device so that this can be easily accessible or removable and be disposed under the sinuous passage between the precipitation chamber I and the blast chamber T.

When the circuitous passage G extends in a vertical plane I prefer to use peripheral extractors or bars Y crossing the inner periphery of its outer wall for separating fine material from the outer circumference of the current flowing through the passage as this current impinges centrifugally against this wall.

The filtering troughs s according to my invention are disposed in advance of the ingress side of the blower F to separate floating particles from the current before it reaches the blower, and it will be understood that these may be disposed at any convenient or desired point between the means for feeding material to be separated and the ingress side of the means for causing the current to flow, and that they may be any suitable provisions affording downwardly extending faces in the path of and opposed to the current for intercepting particles floating therein and affording downward ways for such particles, and affording between such ways apertures affording horizontally extending current passages for the current.

What I claim is:

1. In combination, a casing affording a separating chamber, means within said casing partitioning said chamber, and affording an endless current passage therein, means for causing material to descend across said passage in a downward path, means below said partitioning means for causing a fluid current to flow through said passage across said path to float fine material therefrom, means in said passage beyond said path for separating fine material from said current, means affording a return conduit communicating between said separating means and the other side of said path for returning said current to the other side of said path, and means affording a coarse outlet for coarse material below said path.

2. In combination, a casing affording a separating chamber comprising an endless current passage, means for causing material to be separated to descend across said passage in a downwardly extending path, means in said passage for causing a fluid current to flow through said passage and across said path for floating fine material therefrom, means affording an outlet for coarse material below said path, and means across said passage for separating fine material floating in said current disposed approximately vertically in said passage between said path and the ingress side of said current means.

3. In combination, a casing affording a separating chamber, means affording a current passage within said chamber, means for causing material to be separated to descend in said passage in a downward path, means for causing a fluid to flow in said passage across said path to float fine material therefrom. means in said passage successive to said path for intercepting large particles floating in such current affording a current passage for such current and a lower outlet for intercepted material, means across said passage and successive to said intercepting means for separating fine material from such current disposed approximately vertically and intermediate of said intercepting means and the ingress side of said current means. means affording a return current passage for such current communicating between said separating means and the other side of said path, and means affording an outlet for coarse material below said path.

4. In combination, a casing affording a separating chamber, means affording a current passage within said chamber, means for causing material to be separated to descend in said passage in a downward path, means for causing a fluid current to flow in said passage across said path for floating fine material therefrom, means across said passage for extracting fine material floating in said current disposed approximately vertically and successive to said path and intermediate of said path and the ingress side of said current means, means affording a dust chamber between said path and said extracting means, means affording a return current passage communicating between said extracting means and the other side of said path, and means affording an outlet for coarse material below said path.

5. In combination, a casing affording a separating chamber, means within said chamber affording an endless current passage, means for causing material to be separated to descend in said passage in a downward path, means for causing a fluid current to flow in said passage across said path to float fine material therefrom, means successive to said path for intercepting large particles floating in such current affording a passage for such current and a lower outlet for intercepted particles, means affording a dust chamber in said passage successive to said intercepting means, means across said passage for extracting fine material floating in such current and disposed approximately vertically and between said dust chamber and the ingress side of said current means, and means affording an outlet for coarse material below said path.

6. In combination, means affording a current passage, means for causing material to be separated to descend across said passage in a downward path, means for causing a fluid current to flow in said passage across said path to float fine material therefrom, means across said passage and at one side of said path for separating fine material floating in said current through said passage and disposed approximately vertically and successive to said path and in advance of the ingress side of said current means, and means affording an outlet for coarse material below said path.

7. In combination, a casing affording an approximately cylindrical separating chamber, means partitioning said chamber into an endless current passage, means for causing material to descend across said passage in a downward path, means in a lower portion of said passage for causing a fluid current to flow in said passage across said path to float fine material therefrom, means communicating with said passage at one side of said path for separating fine material from said current, means communicating between said separating means and the other side of said path for returning such current, and means affording an outlet for coarse material below said path.

8. In combination, a casing affording a current passage, means for causing material to be separated to descend in said passage in a downward path, means for causing a fluid current to flow in said passage across said path to float fine material therefrom, means in said passage successive to said path for intercepting coarse particles floating in such current affording a current passage for such current and a lower outlet for intercepted particles, means across said passage successive to said intercepting means for separating fine material floating in such current and disposed approximately vertically and between said intercepting means and the ingress side of said current means, and means below said intercepting means affording an outlet for coarse material.

9. In combination, means affording a current passage, means for introducing material to be separated into said passage, means for causing a fluid current to flow through said passage for floating fine material therethrough, means in said passage in the path of such current successive to said introducing means for intercepting particles floating in such current affording a current passage for such current and a lower outlet for intercepted particles, means affording a precipitation chamber successive to and receiving such current from said intercepting means, means across said passage and successive to said precipitation chamber for separating fine material floating in such current and disposed approximately vertically and between said precipitation chamber and the ingress side of said current means, and means affording an outlet for particles below said intercepting means.

10. In combination, a casing affording a separating chamber comprising a current passage, means for causing material to descend across said passage in a downward path, means affording an inlet for material above said path, means below said inlet for causing a fluid current to flow through said passage across said path for floating fine material therefrom, means at one side of said path for separating fine material from said current, means communicating between said separating means and the other side of said path for returning such current, means affording an outlet for coarse material below said path, and means affording a closure for preventing current leakage outwardly through said inlet.

11. In combination, a casing affording a separating chamber, a downwardly extending wall within and partitioning said chamber within an endless current passage, means at one side of said wall for causing material to descend across said passage in a downward path, means below said partitioning means for causing a fluid current to flow in said passage across said path to float fine material therefrom, means at the other side of said wall affording an outlet for fine material separated from said current, and means below said path affording an outlet for coarse material therefrom.

12. In combination, a casing affording a separating chamber, a downwardly extending wall within and partitioning said chamber into an endless current passage, means at one side of said wall for causing material to descend across said passage in a downward path, means at the other side of said wall and below said path for causing a fluid current to flow through said passage across said path for floating fine material therefrom, means affording an outlet for fine material from said passage at one side of said path, and means affording an outlet for coarse material from said passage below said path.

13. In combination, a casing affording a separating chamber comprising a peripheral current passage, means for causing material to descend across said passage in a downward path, a blower in advance of said path for causing a fluid current to circulate in said passage across said path for floating fine material therefrom, means affording an outlet for fine material separated from said current, means affording an outlet for coarse material below said path, and means affording a surrounding chamber for said casing in communication with the suction side of said blower.

14. In combination, a casing affording an endless current passage, means for causing material to be separated to descend in a downward path across said passage, means for causing a fluid current to flow through said passage across such path for floating fine material therefrom, filtering means across said passage for separating fine material floating in such current and disposed approximately vertically and between said path and the ingress side of said current means, and means affording an outlet for material separated by said filtering means.

15. In combination, means affording an endless current passage, means for causing material to be separated to descend across said passage in a downward path, means for causing a fluid current to flow through said passage across said path for floating fine material therefrom, means affording an approximately vertical foraminous wall across said passage successive to said path for separating fine material floating in such current and disposed between said path and the ingress side of said current means, and means affording an outlet for material separated from such current.

16. In combination, means affording a tubular current passage having an inlet and an outlet, means affording a return current passage communicating between said outlet and said inlet, means for causing material to descend across said tubular passage in a downward path comprising a plurality of superposed baffles extending from side to side of said tubular passage and affording current passages between them collectively in communication with said outlet, means for causing a fluid current to flow through said passages across said path for floating fine material therefrom, means successive to said outlet for separating fine material from said current, and an outlet for coarse material below said path.

17. In combination, means affording a tubular current passage having an inlet and an outlet, means affording a return current passage communicating between said outlet and said inlet, means for causing a fluid current to circulate through said passages, means in said tubular passage in advance of said outlet for selecting large particles floating in said current comprising a plurality of superposed baffles crossing said tubular passage from side to side thereof and affording downward outlets for selected particles and affording between them current passages collectively in communication with said outlet, means successive to said outlet for separating fine material from said current, and an outlet for coarse particles below said selecting means.

18. In combination, means affording a tubular current passage, means for introducing material to be separated into said passage, means for causing a fluid current to flow in said passage and through such material for floating fine material therefrom, means for separating fine material floating in such current comprising a vertically extending wall intersecting said passage and affording downwardly extending faces in the path of such current affording ways for separated material and affording intermediate of such faces apertures affording passages for such current, and disposed between said introducing means and the ingress side of said current means, and means below said wall affording an outlet for separated material.

19. In combination, means affording an endless current passage comprising a blast chamber, a feeding chamber successive thereto, a precipitation chamber successive to said feeding chamber, and a sinuous passage communicating between the latter and said blast chamber, means for causing a fluid current to circulate through said passage comprising a fan successive to said precipitation chamber and exhausting from said sinuous passage and discharging into said blast chamber, means affording a recess or chamber opposite said sinuous passage intermediate of said precipitation and blast chambers, and means for operating said fan mounted in said recess or chamber.

20. In combination, a substantially cylindrical casing disposed about a horizontal axis and enclosing a chamber, means for causing a fluid current to flow around within and circumferentially of said chamber, and means within said chamber for intercepting particles floating in such current comprising vertically extending faces disposed in the path of and opposed to such current affording downward ways for intercepted particles and affording between such ways apertures affording horizontally extending current passages for such current.

21. In combination, a casing enclosing a chamber disposed about and surrounding a horizontal axis and affording a current passage around such axis, means for feeding material to be separated to said chamber, means for causing a fluid current to flow through said passage to float such material therein, and means for separating floating material from such current mounted in said passage and comprising vertically extending faces disposed in the path of and opposed to such current and affording downward ways for material separated therefrom and affording apertures intermediate of such ways affording horizontally extending current passages for such current.

22. In combination, a casing enclosing a chamber disposed about and surrounding a horizontal axis and affording a current passage around such axis, means for feeding material to be separated to said chamber, means for causing a fluid current to flow through said passage to float such material therein, and means for separating floating material from such current mounted in said passage and comprising vertically extending faces disposed in the path of and opposed to such current and affording downward ways for material separated therefrom and affording apertures intermediate of such ways affording horizontally extending current passages for such current, and a second series of vertically extending faces successive to and disposed opposite the apertures of said first faces and affording apertures successive to and opposite said first faces affording horizontally extending current passages for such current.

23. In combination, a casing enclosing a chamber disposed about and surrounding a horizontal axis and affording a current passage around such axis, means for feeding material to be separated to said chamber, means for causing a fluid current to flow through said passage to float such material therein, and means for separating floating material from such current mounted in said passage and comprising vertically extending troughs disposed in the path of and with their hollow faces opposed to such current and affording downward ways for separated material and affording between their hollow faces apertures affording horizontally extending current passages for such current.

24. In combination, a casing enclosing a chamber disposed about and surrounding a horizontal axis and affording a current passage around such axis, means for feeding material to be separated to said chamber, means for causing a fluid current to flow through said passage to float such material therein, and means for separating floating material from such current mounted in said passage and comprising vertically extending troughs disposed in the path of and with their hollow faces opposed to such current and affording downward ways for separated material and affording between their hollow faces apertures affording horizontally extending current passages for such current, and a second series of vertically extending troughs disposed with their hollow faces opposite the apertures of said first mentioned troughs and affording apertures intermediate of their hollow faces and opposite the faces of said first mentioned troughs affording horizontally extending current passages for such current.

In witness whereof, I have hereunto signed my name in the presence of two subscribing witnesses.

GEORGE HOLT FRASER.

Witnesses:
 CHARLES E. DONNELLY,
 SIGVARD G. HELLEM.